(12) United States Patent
Nakajima et al.

(10) Patent No.: US 10,941,458 B2
(45) Date of Patent: Mar. 9, 2021

(54) NON-ORIENTED ELECTRICAL STEEL SHEET, PRODUCTION METHOD THEREFOR, AND MOTOR CORE

(71) Applicant: JFE STEEL CORPORATION, Tokyo (JP)

(72) Inventors: Hiroaki Nakajima, Tokyo (JP); Tomoyuki Okubo, Tokyo (JP); Tadashi Nakanishi, Tokyo (JP); Yoshihiko Oda, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 712 days.

(21) Appl. No.: 15/551,849

(22) PCT Filed: Jan. 7, 2016

(86) PCT No.: PCT/JP2016/050300
§ 371 (c)(1),
(2) Date: Aug. 17, 2017

(87) PCT Pub. No.: WO2016/132753
PCT Pub. Date: Aug. 25, 2016

(65) Prior Publication Data
US 2018/0066333 A1   Mar. 8, 2018

(30) Foreign Application Priority Data

Feb. 18, 2015 (JP) .............................. JP2015-029478

(51) Int. Cl.
*C21D 9/46*   (2006.01)
*C21D 8/12*   (2006.01)
(Continued)

(52) U.S. Cl.
CPC ................. *C21D 9/46* (2013.01); *C21D 1/74* (2013.01); *C21D 6/008* (2013.01); *C21D 8/1233* (2013.01);
(Continued)

(58) Field of Classification Search
None
See application file for complete search history.

(56) References Cited

U.S. PATENT DOCUMENTS 3,650,851 A   3/1972   Stefan et al.
4,046,602 A   9/1977   Stanley
(Continued)

FOREIGN PATENT DOCUMENTS

CN   1796015 A   7/2006
CN   101218362 A   7/2008
(Continued)

OTHER PUBLICATIONS

Machine translation of JP2011-219795A. (Year: 2011).*
(Continued)

*Primary Examiner* — Xiaowei Su
(74) *Attorney, Agent, or Firm* — RatnerPrestia (57) ABSTRACT

In the production of a non-oriented electrical stress sheet by hot rolling a slab having a chemical composition comprising, by mass %, C: not more than 0.005, Si: 1.5-6.0, Mn: 0.05-2.0 and P: 0.03-0.15, subjecting to a hot band annealing, if necessary, cold rolling, finish annealing, and forming an insulation coating, the cooling from 700° C. to 500° C. in the finish annealing is conducted in an oxidizing atmosphere with an oxygen potential $P_{H2O}/P_{H2}$ of not less than 0.001 for 1-300 seconds, whereby P is segregated into the surface of the steel sheet after the finish annealing to obtain a non-oriented electrical steel sheet enhancing a crystal grain growth properties in the stress relief annealing.

14 Claims, 2 Drawing Sheets

(51) Int. Cl.

| | | |
|---|---|---|
| *C21D 6/00* | (2006.01) | |
| *H01F 1/147* | (2006.01) | |
| *C22C 38/06* | (2006.01) | |
| *C22C 38/60* | (2006.01) | |
| *H02K 1/02* | (2006.01) | |
| *C22C 38/00* | (2006.01) | |
| *C22C 38/02* | (2006.01) | |
| *C22C 38/04* | (2006.01) | |
| *H01F 1/16* | (2006.01) | |
| *C21D 1/74* | (2006.01) | |
| *H01F 41/02* | (2006.01) | |
| *H02K 15/02* | (2006.01) | |

(52) U.S. Cl.
CPC ......... *C21D 8/1266* (2013.01); *C21D 8/1272* (2013.01); *C22C 38/00* (2013.01); *C22C 38/001* (2013.01); *C22C 38/002* (2013.01); *C22C 38/004* (2013.01); *C22C 38/008* (2013.01); *C22C 38/02* (2013.01); *C22C 38/04* (2013.01); *C22C 38/06* (2013.01); *C22C 38/60* (2013.01); *H01F 1/14783* (2013.01); *H01F 1/16* (2013.01); *H01F 41/0233* (2013.01); *H02K 1/02* (2013.01); *H02K 15/02* (2013.01); *C21D 8/1222* (2013.01); *C21D 8/1283* (2013.01)

(56) References Cited

U.S. PATENT DOCUMENTS

| | | | |
|---|---|---|---|
| 6,773,514 | B1 | 8/2004 | Kawalla et al. |
| 7,470,333 | B2 | 12/2008 | Ohashi et al. |
| 8,557,058 | B2 | 10/2013 | Arita et al. |
| 9,978,488 | B2 | 5/2018 | Zaizen et al. |
| 10,597,759 | B2 * | 3/2020 | Nakanishi ............... C22C 38/00 |
| 2008/0121314 | A1 | 5/2008 | Choi et al. |
| 2009/0202383 | A1 | 8/2009 | Tanaka et al. |
| 2013/0146187 | A1 | 6/2013 | Zaizen et al. |
| 2013/0263981 | A1 | 10/2013 | Zaizen et al. |
| 2014/0345751 | A1 | 11/2014 | Oda et al. |
| 2015/0059929 | A1 | 3/2015 | Zaizen et al. |
| 2015/0357101 | A1 | 12/2015 | Zaizen et al. |
| 2016/0042850 | A1 | 2/2016 | Oda et al. |
| 2016/0203896 | A1 | 7/2016 | Nakanishi et al. |
| 2016/0273064 | A1 * | 9/2016 | Kataoka .................. C21D 8/12 |
| 2017/0241002 | A1 | 8/2017 | Nakajima et al. |
| 2018/0066333 | A1 | 3/2018 | Nakajima et al. |

FOREIGN PATENT DOCUMENTS

| | | | |
|---|---|---|---|
| CN | 103270179 A | | 8/2013 |
| CN | 105378130 A | | 3/2016 |
| DE | 1936425 A1 | | 12/1970 |
| EP | 2778246 A1 | | 9/2014 |
| EP | 2826872 A1 | | 1/2015 |
| EP | 2975152 A1 | | 1/2016 |
| EP | 3037565 A1 | | 6/2016 |
| JP | 60114521 A | | 6/1985 |
| JP | 362102507 A | | 5/1987 |
| JP | 03229820 A | | 10/1991 |
| JP | 05186834 A | | 7/1993 |
| JP | 0841541 A | | 2/1996 |
| JP | 2500033 B2 | | 5/1996 |
| JP | 09241809 A | | 9/1997 |
| JP | 09310124 A | | 12/1997 |
| JP | 2898793 B2 | | 6/1999 |
| JP | 2000273549 A | | 10/2000 |
| JP | 2001323345 A | | 11/2001 |
| JP | 2004292829 A | | 10/2004 |
| JP | 2005200756 A | | 7/2005 |
| JP | 2006144036 A | | 6/2006 |
| JP | 3870893 B2 | | 1/2007 |
| JP | 4126479 B2 | | 7/2008 |
| JP | 2008524449 A | | 7/2008 |
| JP | 2010248559 A | | 11/2010 |
| JP | 2011084761 A | | 4/2011 |
| JP | 4718749 A | | 7/2011 |
| JP | 2011219795 A | * | 11/2011 |
| JP | 2012036454 A | | 2/2012 |
| JP | 2012046806 A | | 3/2012 |
| JP | 2012132070 A | | 7/2012 |
| JP | 2013010982 A | | 1/2013 |
| JP | 5228379 B2 | | 7/2013 |
| JP | 2013133485 A | | 7/2013 |
| JP | 2013189693 A | | 9/2013 |
| JP | 2014173099 A | | 9/2014 |
| JP | 2014198896 A | | 10/2014 |
| JP | 2015040309 A | | 3/2015 |
| KR | 100567239 B1 | | 4/2006 |
| KR | 20140044929 A | | 4/2014 |
| RU | 2311479 C2 | | 11/2007 |
| RU | 2398894 C1 | | 9/2010 |
| RU | 2409693 C2 | | 1/2011 |
| TW | 201435090 A | | 9/2014 |
| TW | 201443246 A | | 11/2014 |
| TW | 201446977 A | | 12/2014 |
| WO | 2014129034 A1 | | 8/2014 |
| WO | 2014142100 A1 | | 9/2014 |
| WO | 2014168136 A1 | | 10/2014 |
| WO | 2016027565 A1 | | 2/2016 |

OTHER PUBLICATIONS

Chinese Office Action for Chinese Application No. 201680010167.3, dated Apr. 23, 2018 with translation, 10 pages.
Lee, S., "Effect of Phosphorus on the Magnetic Properties of Non-oriented Electrical Steel," Doctoral Dissertation, Pohang University of Science and Technology, Dec. 20, 2011—146 pages.
Korean Office Action for Korean Application No. 2017-7022151, dated Oct. 24, 2018, 6 pages.
International Search Report and Written Opinion for International Application No. PCT/JP2016/050300, dated Apr. 12, 2016—5 Pages.
Taiwanese Office Action with Search Report for Taiwan Application No. 105101735, dated Jul. 21, 2015, with partial translation—5 Pages.
Non Final Office Action for U.S. Appl. No. 15/750,037, dated Feb. 6, 2020, 15 pages.
International Search Report and Written Opinion for International Application No. PCT/JP2016/068943, dated Sep. 27, 2017, 9 pages.
Japanese Office Action for Japanese Application No. JP2016/561399, dated Sep. 6, 2017, 6 pages.
Korean Office Action for Korean Application No. 10-2017-7037171, dated Jun. 24, 2019, 6 pages.
Chinese Office Action for Chinese Application No. 201680045305.1, dated Nov. 28, 2018, with English Search Report, 11 pages.
Chinese Office Action for Chinese Application No. 201680045305.1, dated Mar. 20, 2019 with Search Report, 10 pages.
Extended European Search Report for European Application No. 16 832 6395, dated Jun. 1, 2018, 16 pages.
Coombs, A., et al., "Review of the Types, Properties, Advantages, and Latest Developments in Insulating Coatings on Nonoriented Electrical Steels," Jan. 1, 2001, 14 pages, vol. 37(1), IEEE Transactions on Magnetics, IEEE Service Center, NY, XP011033313.
Russian Office Action for Russian Application No. 2017130548, dated Jun. 29, 2018, with translation, 8 pages.
Extended European Search Report for European Application No. 16752142.6, dated Nov. 30, 2017, 11 pages.
Final Office Action for U.S. Appl. No. 15/750,037, dated Jul. 14, 2020, 13 pages.
Non Final Office Action for U.S. Appl. No. 14/909,978, dated Apr. 4, 2017, 12 pages.

* cited by examiner

NON-ORIENTED ELECTRICAL STEEL SHEET, PRODUCTION METHOD THEREFOR, AND MOTOR CORE

CROSS REFERENCE TO RELATED APPLICATIONS

This is the U.S. National Phase application of PCT/JP2016/050300, filed Jan. 7, 2016, which claims priority to Japanese Patent Application No. 2015-029478, filed Feb. 18, 2015, the disclosures of these applications being incorporated herein by reference in their entireties for all purposes.

TECHNICAL FIELD OF THE INVENTION

This invention relates to a non-oriented electrical steel sheet and a production method therefor as well as a motor core, and more particularly to a non-oriented electrical steel sheet having excellent magnetic properties after stress relief annealing and a production method therefor as well as a motor core (rotor core and stator core) produced by using the non-oriented electrical steel sheet.

BACKGROUND OF THE INVENTION

With high global demand in recent years for energy saving on electrical machinery, a non-oriented electrical steel sheet used as an iron core (motor core) in a rotary machine has been also demanded to have more excellent magnetic properties. Recently, a motor for an electric vehicle has a strong need for downsizing and high output, so that it is designed to gain motor torque by increasing the rotation number of the motor.

The motor core is divided into a stator core and a motor core. However, the motor for the electric vehicle has an outer diameter larger than that of the conventional one to act a large centrifugal force, or a very narrow portion of 1-2 mm exists in an outer periphery of the rotor core depending on the structure thereof, so that the non-oriented electrical steel sheet used in the rotor core is required to have higher strength than before. On the other hand, in order to reduce the motor size and save energy, the stator core is required to have a low iron loss. To this end, it is ideal that the steel sheet used for the motor core has a high strength for the rotor core and a low iron loss for the stator core.

As described above, even when the electrical steel sheet is used in the same motor core, the required characteristics are largely different between the rotor core and the stator core. In order to increase a material yield in the production of the motor core, therefore, it is desirable that rotor core materials and stator core materials are simultaneously taken out from the same raw steel sheet by punching and then assembled into a rotor core and a stator core by lamination, respectively.

As a method for producing the aforementioned non-oriented electrical steel sheet having a high strength and a low iron loss, for example, Patent Document 1 proposes a method wherein a non-oriented electrical steel sheet with a high strength is first produced and rotor core materials are taken out therefrom and thereafter a non-oriented electrical steel sheet with a low iron loss is produced by subjecting the steel sheet to a stress relief annealing and stator core materials are taken out therefrom. In this method, impurity elements (Ti, S, N, V, Nb, Zr, As) contained in the steel are reduced to an extremely low level for promoting crystal grain growth in the stress relief annealing, and further a skin pass rolling is performed before the stress relief annealing.

Recently, there is a movement that the used motor core is melted to reuse in a motor frame as a cast metal from a viewpoint of recycling the motor. However, the electrical steel sheet disclosed in Patent Document 1 is added with Al, so that there is a problem that the viscosity of the molten steel is increased at the time of casting to cause shrinkage cavities when it is reused. Thus, it is desirable that Al is substantially free when the motor core is recycled as a foundry pig.

Patent Document 2 discloses a non-oriented electrical steel sheet being substantially free from Al, which is capable of taking out rotor core materials and stator core materials therefrom. This technique uses a method wherein a high-strength non-oriented steel sheet is first produced and rotor core materials are taken out therefrom and thereafter the residual steel sheet is subjected to a stress relief annealing for taking out stator core materials like Patent Document 1. It is characterized by limiting Si, Mn, C, Sol. Al and N contents in order to promote crystal grain growth in the stress relief annealing and further controlling the number density of ductile inclusions inhibiting the grain growth.

PRIOR ART DOCUMENTS

Patent Documents

Patent Document 1: Japanese Patent No. 5228379
Patent Document 2: Japanese Patent No. 4718749

SUMMARY OF THE INVENTION

However, the method disclosed in the Patent Document 2 has a problem that the non-oriented electrical steel sheet having a low iron loss cannot be produced because Si content effective for reducing the iron loss is limited to not more than 1.2 mass %.

Aspects of the invention are made in view of the above problems inherent to the conventional techniques, and the object thereof is to provide a non-oriented electrical steel sheet capable of simultaneously taking out rotor core materials having a high strength and stator core materials having a low iron loss from the same raw steel sheet despite that the steel sheet is substantially free from Al, and an advantageous method of producing the same as well as a motor core (rotor core and stator core) produced by using the steel sheet.

The inventors have made various studies focusing on the influence of the steel ingredients upon the strength and crystal grain growth properties for solving the above task. As a result, they have found that a non-oriented electrical steel sheet having a high content of Si and being substantially free from Al is added with a predetermined amount of P to increase crystal grain growth properties in a stress relief annealing, whereby rotor core materials having a high strength can be taken out from the steel sheet after finish annealing and stator core materials can be taken out from the steel sheet after stress relief annealing simultaneously, and it is important to segregate P in the surface layer of the steel sheet in the finish annealing, and thus the invention has been accomplished.

That is, an aspect of the invention is a non-oriented electrical steel sheet is having a chemical composition comprising C: not more than 0.005 mass %, Si: 1.5-6.0 mass %, Mn: 0.05-2.0 mass %, P: 0.03-0.15 mass %, S: not more than 0.005 mass %, N: not more than 0.005 mass %, Al: not more than 0.005 mass % and the remainder being Fe and inevitable impurities, wherein a ratio ($P_{120}/Fe_{700}$) of a peak to peak height $P_{120}$ of P near to an electronic energy of 120 eV to a peak to peak height $Fe_{700}$ of Fe near to an electronic energy of 700 eV in an Auger differential spectrum obtained by analyzing a surface of the steel sheet after a finish annealing by Auger electron spectroscopy is not less than 0.02.

The non-oriented electrical steel sheet according to another aspect of the invention is characterized by containing one or two selected from Sn: 0.005-0.2 mass % and Sb: 0.005-0.2 mass % in addition to the above chemical composition.

The non-oriented electrical steel sheet according to another aspect of the invention is characterized in that a yield strength is not less than 400 MPa.

Also, an aspect of the invention proposes a method for producing a non-oriented electrical steel sheet by hot rolling a slab having the above-described chemical composition, pickling without a hot band annealing or after a hot band annealing or self-annealing, performing one cold rolling or two or more cold rollings interposing an intermediate annealing therebetween, performing a finish annealing and forming an insulation coating, characterized in that cooling from 700° C. to 500° C. in the finish annealing is conducted in an oxidizing atmosphere having an oxygen potential $P_{H2O}/P_{H2}$ of not less than 0.001 for 1-300 seconds.

Another aspect of the invention is a rotor core for a rotary machine formed by punching out rotor core materials from any one of the non-oriented electrical steel sheets described above and laminating them.

Another aspect of invention is a stator core for a rotary machine formed by punching out stator core materials from any one of the non-oriented electrical steel sheets described above, laminating them and subjecting to a stress relief annealing.

According to aspects of the invention, it is possible to produce a non-oriented electrical steel sheet having a high strength after a finish annealing and a low iron loss after a stress relief annealing, so that rotor core materials having a high strength and stator core materials having a low iron loss can be taken out from the same raw material steel sheet simultaneously, which can contribute to an improvement in a material yield of the motor core and a reduction in a material cost.

DETAILED DESCRIOTION OF EMBODIMENTS OF THE INVENTION

There will be described experiments building a momentum for developing aspects of the invention.
<Experiment 1>
Firstly, an experiment is conducted for studying an influence of Si on the crystal grain growth properties in the stress relief annealing.

A steel containing C: 0.003 mass %, Mn: 0.05 mass %, P: 0.01 mass %, S: 0.002 mass %, N: 0.002 mass % and Al: 0.001 mass % and added with Si in an amount varying within a range of 0.5-4.0 mass % is melted laboratorially to provide a steel ingot, which is hot rolled to form a hot rolled sheet having a sheet thickness of 2.0 mm.

Then, the hot rolled sheet is subjected to a hot band annealing at 1000° C. for 30 seconds, pickled and cold rolled to form a cold rolled sheet having a sheet thickness of 0.25 mm, which is thereafter subjected to a finish annealing at 800° C. for 10 seconds in a non-oxidizing atmosphere having an oxygen potential $P_{H2O}/P_{H2}$ of 0.0005 (10 vol % of $H_2$–90 vol % of $N_2$ and a dew point of −50° C.) to provide a non-oriented electrical steel sheet, and an iron loss $W_{10/400}$ thereof is measured by a 25 cm Epstein method.

Next, the steel sheet is subjected to a stress relief annealing in an $N_2$ atmosphere at 750° C. for 2 hours, and an iron loss $W_{10/400}$ thereof is again measured by a 25 cm Epstein method.

Figure 1:
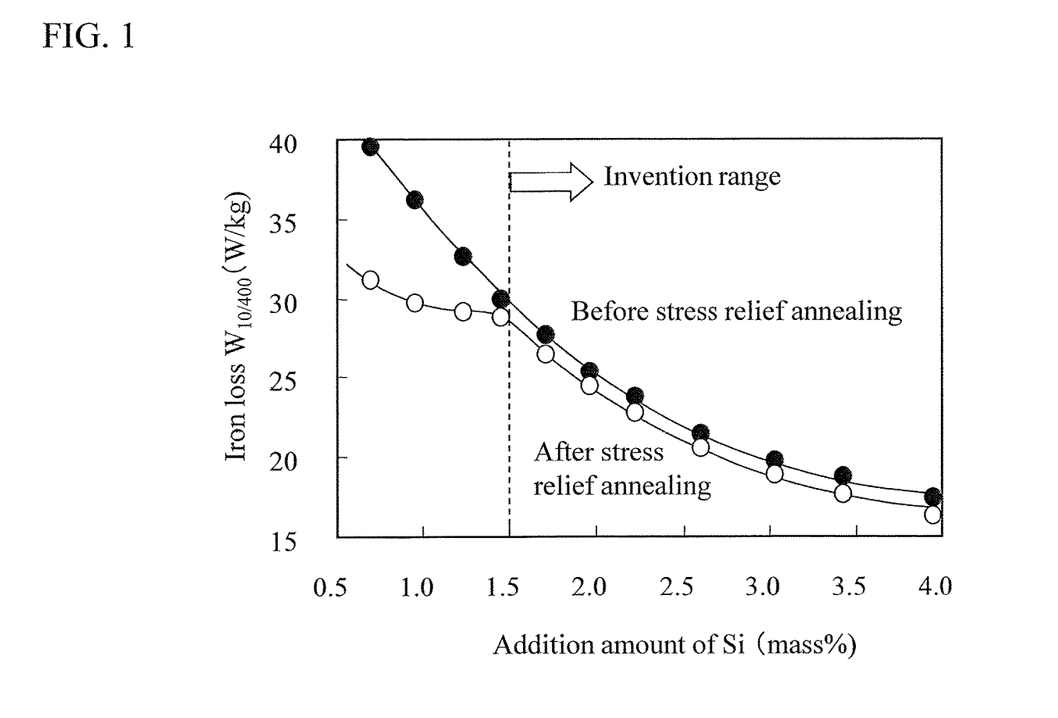
FIG. 1 is a graph showing a relation between an addition amount of Si and an iron loss $W_{10/400}$ before and after a stress relief annealing.

FIG. 1 shows a relation between the iron loss $W_{10/400}$ before and after the stress relief annealing and the addition amount of Si. As seen from this figure, when the addition amount of Si is 0.5-1.5 mass %, the ion loss $W_{10/400}$ is decreased by the stress relief annealing, while when the addition amount of Si is not less than 1.5 mass %, the iron loss $W_{10/400}$ is not decreased.

In order to examine this cause, the structure of the steel sheet after the stress relief annealing is observed by TEM, and as a result, a large number of fine $Si_3N_4$ precipitates are found near the surface layer in a steel sheet having a Si addition amount of not less than 1.5 mass %, while the fine precipitates are not found in a steel sheet having a Si addition amount of 0.5-1.5 mass %. It is revealed from this result that in the steel sheet having a large addition amount of Si, N penetrated from the atmosphere into the steel reacts with Si in the steel to precipitate fine $Si_3N_4$, whereby the grain growth is blocked and the iron loss properties is not improved.

<Experiment 2>
Next, the inventors have studied an influence of an atmosphere in the stress relief annealing and an addition amount of P upon the crystal grain growth properties.

A steel containing C: 0.003 mass %, Si: 3.0 mass %, Mn: 0.05 mass %, S: 0.002 mass %, N: 0.002 mass %, Al: 0.001 mass % and added with P in an amount varying within a range of 0.01-0.15 mass % is melted laboratorially to provide a steel ingot, which is hot rolled to form a hot rolled sheet having a sheet thickness of 2.0 mm.

Then, the hot rolled sheet is subjected to a hot band annealing at 1000° C. for 30 seconds, pickled and cold rolled to form a cold rolled sheet having a sheet thickness of 0.25 mm, which is thereafter subjected to a finish annealing at 800° C. for 10 seconds in a non-oxidizing atmosphere having an oxygen potential $P_{H2O}/P_{H2}$ of 0.0005 (10 vol % of $H_2$–90 vol % of $N_2$ and a dew point of −50° C.) to provide a non-oriented electrical steel sheet. In this case, the cooling from 700° C. to 500° C. is conducted for 10 seconds on the following 3 conditions:

Condition A: A non-oxidizing atmosphere having $P_{H2O}/P_{H2}$ of 0.0005 (10 vol % of $H_2$–90 vol % of $N_2$ and a dew point of −50° C.);

Condition B: An oxidizing atmosphere having $P_{H2O}/P_{H2}$ of 0.01 (2 vol % of $H_2$–98 vol % of $N_2$ and a dew point of −40° C.); and Condition C: An oxidizing atmosphere having $P_{H2O}/P_{H2}$ of 0.5 (0.1 vol % of $H_2$–99.9 vol % of $N_2$ and a dew point of −30° C.).

With respect to the thus obtained steel sheets after the finish annealing is measured an iron loss $W_{10/400}$ by a 25 cm Epstein method. Moreover, the steel sheet is subjected to a stress relief annealing in a $N_2$ atmosphere at 750° C. for 2 hours, and an iron loss $W_{10/400}$ is again measured by a 25 cm Epstein method.

Figure 2:
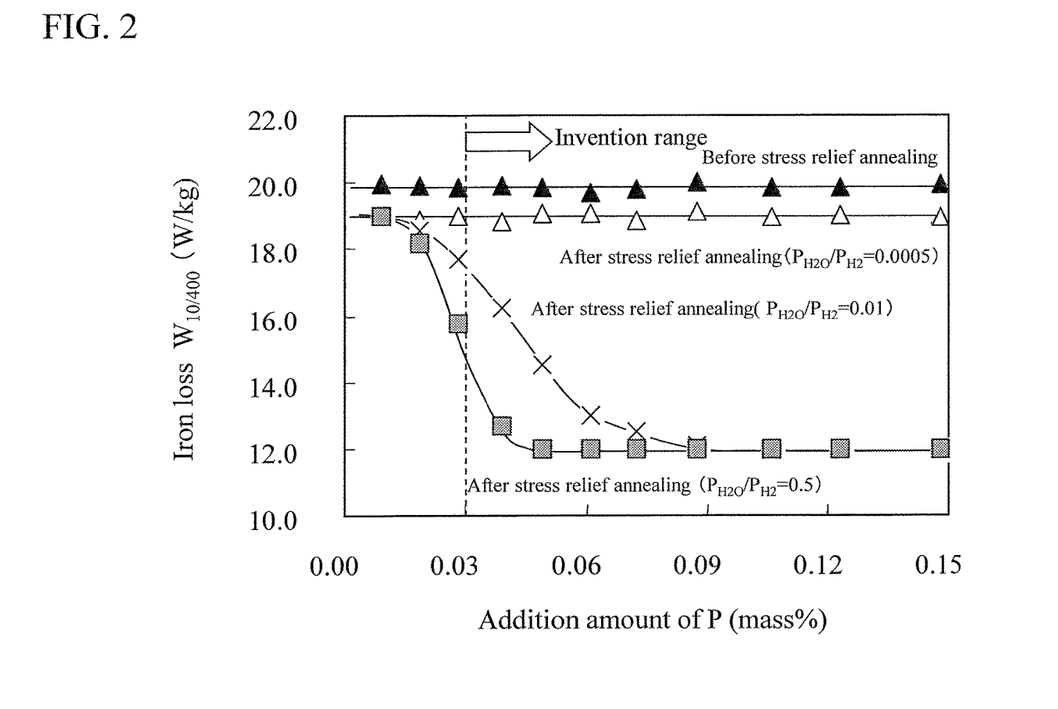
FIG. 2 is a graph showing a relation between an addition amount of P and an iron loss $W_{10/400}$ before and after a stress relief annealing.

FIG. 2 shows a relation between the iron loss $W_{10/400}$ before and after the stress relief annealing and the addition amount of P. Since the iron loss $W_{10/400}$ before the stress relief annealing is almost constant irrespective of $P_{H2O}/P_{H2}$ in the atmosphere during the cooling, an iron loss $W_{10/400}$ at $P_{H2O}/P_{H2}$ of 0.0005 is shown in FIG. 2.

As seen from FIG. 2, the iron loss properties in the steel sheet cooled at $P_{H2O}/P_{H2}$ of 0.0005 is not improved so much even in the stress relief annealing, while the iron loss in the steel sheet cooled at $P_{H2O}/P_{H2}$ of 0.01 or 0.5 is largely decreased when the addition amount of P is not less than 0.03 mass %.

As the structure of the steel sheet after the stress relief annealing is observed by TEM, fine $Si_3N_4$ precipitates are found at any case of $P_{H2O}/P_{H2}$ of 0.0005, 0.01 and 0.5 in the steel sheets having a P addition amount of less than 0.03 mass %, while $Si_3N_4$ precipitates are not found in either case of $P_{H2O}/P_{H2}$ of 0.01 or 0.5 in the steel sheets having a P addition amount of not less than 0.03 mass %.

In order to examine this cause, a segregation amount of P in the surface layer of the steel sheet after the finish annealing is analyzed by an Auger electron stereoscopy (AES). Moreover, the segregation amount of P is evaluated by a ratio ($P_{120}/Fe_{700}$) of a peak to peak height $P_{120}$ of P near to an electronic energy of 120 eV to a peak to peak height $Fe_{700}$ of Fe near to an electronic energy of 700 eV in an Auger differential spectrum. Here, the Auger differential spectrum is a spectrum obtained by differentiating an Auger spectrum.

Figure 3:
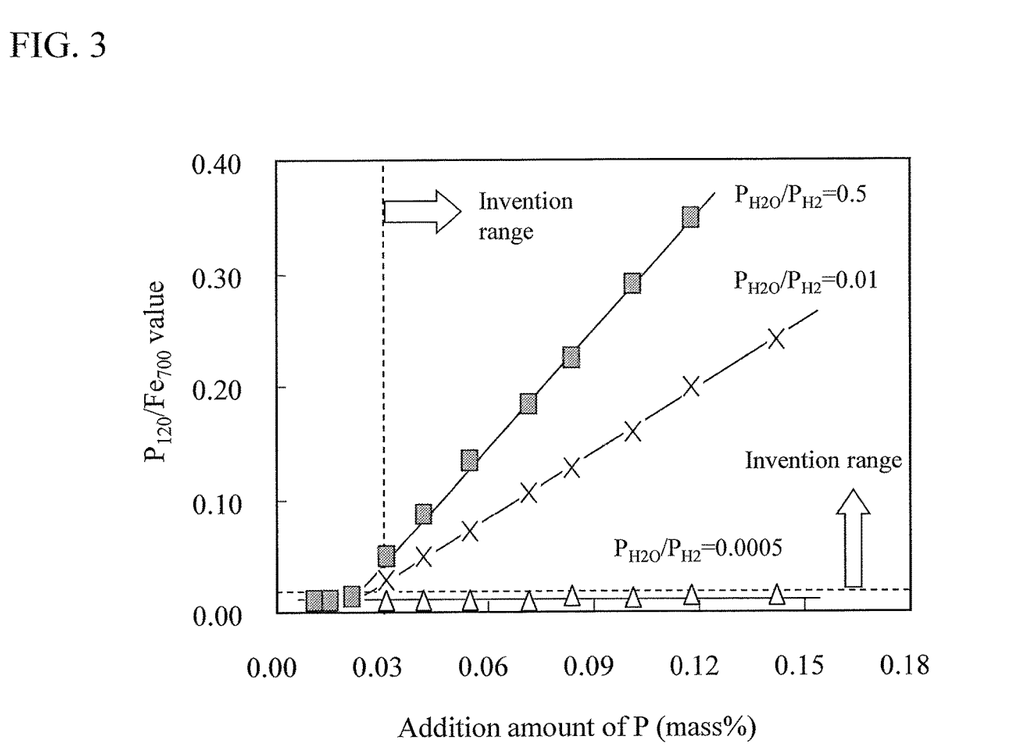
FIG. 3 is a graph showing a relation between an addition amount of P and $P_{120}/Fe_{700}$ near to the surface of the steel sheet after the finish annealing.

FIG. 3 shows a relation between $P_{120}/Fe_{700}$ near the surface layer of the steel sheet and the addition amount of P. As seen from this figure, in the steel sheets cooled at $P_{H2O}/P_{H2}$ of 0.01 or 0.5, P is enriched in the surface layer when the P addition amount is not less than 0.03 mass % to bring about $P_{120}/Fe_{700}$ exceeding 0.02. From this result, it is considered that the reason why the iron loss $W_{10/400}$ is decreased by the stress relief annealing in the steel sheet having the P addition amount of not less than 0.03 mass % is due to the fact that penetration of N from the atmosphere into the steel is inhibited by P enriched on the surface layer through the finish annealing and hence the fine $Si_3N_4$ is not precipitated.

The reason why the segregation of P into the surface layer of the steel sheet is promoted by rendering the atmosphere in the cooling during the finish annealing into an oxidizing atmosphere is not clear sufficiently, but it is considered due to the fact that decarburization is caused in the surface layer of the steel sheet in the oxidizing atmosphere to promote the segregation of P.

It can be seen from the above results that the segregation of P into the surface layer of the steel sheet in the finish annealing is extremely effective for ensuring the crystal grain growth properties in the subsequent stress relief annealing.

Next, the chemical composition of the non-oriented electrical steel sheet according to aspects of the invention will be explained.

C: not more than 0.005 mass %

C is a harmful element causing magnetic aging to deteriorate magnetic properties of a product sheet, so that it is limited to not more than 0.005 mass % in accordance with aspects of the invention. It is preferably not more than 0.003 mass %.

Si: 1.5-6.0 mass %

Si is an element effective for increasing a specific resistance of the steel sheet to decrease an iron loss. In accordance with aspects of the invention, Al as an element increasing an electric resistance like Si is not added, and hence Si is added in an amount of not less than 1.5 mass %. However, steel is remarkably embrittled by an addition exceeding 6.0 mass %. Therefore, Si is a range of 1.5-6.0 mass %. Preferably, it is 1.5-4.0 mass %.

Mn: 0.05-2.0 mass %

Mn is necessary to be added in an amount of not less than 0.05 mass % for preventing red brittleness in the hot rolling. When it exceeds 2.0 mass %, however, the magnetic flux density is decreased and embrittlement becomes prominent. Therefore, Mn is a range of 0.05-2.0 mass %. Preferably, it is a range of 0.05-1.5 mass %.

P: 0.03-0.15 mass %

P is an element effective for ensuring the crystal grain growth properties in the stress relief annealing as described above, and it is necessary to be added in an amount of not less than 0.03 mass %. When it exceeds 0.15 mass %, however, steel is embrittled to hinder the cold rolling. Therefore, P is a range of 0.03-0.15 mass %. Preferably, it is a range of 0.03-0.10 mass %.

S: not more than 0.005 mass %

S is a harmful element forming sulfides such as MnS and the like to increase the iron loss, so that an upper limit is set to 0.005 mass %. Preferably, it is not more than 0.003 mass %.

N: not more than 0.005 mass %

N forms nitrides and blocks the grain growth to deteriorate the iron loss properties, so that it is limited to not more than 0.005 mass %. Preferably, it is not more than 0.003 mass %.

Al: not more than 0.005 mass %

When a slight amount of Al exits, fine AlN is formed to block the grain growth and damage magnetic properties, so that it is limited to not more than 0.005 mass %. Preferably, it is not more than 0.003 mass %.

In the non-oriented electrical steel sheet according to aspects of the invention, the remainder other than the above essential ingredients is Fe and inevitable impurities. However, one or two of Sn and Sb can be contained in the following range.

Sn: 0.005-0.2 mass %, Sb: 0.005-0.2 mass %

Each of Sn and Sb is an element improving the texture to increase the magnetic flux density. In order to obtain the above effect, each element is preferable to be added at least in an amount of not less than 0.005 mass %. When it exceeds 0.2 mass %, however, the above effect is saturated. Therefore, when Sn and/or Sb are added, it is preferable to be add in the above range. More preferably, Sn is a range of 0.01-0.15 mass % and Sb is a range of 0.01-0.15 mass %.

The production method of the non-oriented electrical steel sheet according to aspects of the invention will be described below.

The non-oriented electrical steel sheet according to aspects of the invention can be produced by a well-known method as long as a slab having P content in the above proper range is used as a raw steel material. For example, it can be produced by a method wherein molten steel adjusted to have the above chemical composition through a usual refining process of melting a steel in a converter, an electric furnace or the like and subjecting to a secondary refining in a degassing facility or the like is shaped into a slab by a continuous casting method and hot rolled to form a hot rolled sheet, which is subjected to a hot band annealing, if necessary, pickled, cold rolled to form a cold rolled sheet, and then subjected to a finish annealing.

The sheet thickness of the steel sheet after the hot rolling (hot rolled sheet) is preferably a range of 1.0-5.0 mm. When it is less than 1.0 mm, rolling troubles are increased in the hot rolling, while when it exceeds 5.0 mm, the cold rolling reduction becomes extremely high to deteriorate the texture.

In the case of performing the hot band annealing, it is preferable that a soaking temperature is a range of 900-1200° C. When it is lower than 900° C., the effect of the hot band annealing is small and the magnetic properties are not sufficiently improved, while when it exceeds 1200° C., it becomes disadvantageous costly, and further the surface defects are caused due to scales. More preferably, it is a range of 950-1050° C.

Moreover, a self-annealing of a coil wound after the hot rolling may be utilized instead of the hot band annealing. In this case, the winding temperature of the coil is preferably not lower than 600° C. and more preferably not lower than 620° C. The upper limit of the winding temperature is preferable to be not higher than 750° C. from a viewpoint of preventing scale residue caused in the pickling of the hot rolled sheet.

The cold rolling after the hot rolling or hot band annealing is preferably conducted once or two or more interposing an intermediate annealing therebetween. In particular, the final cold rolling is preferable to be a warm rolling conducted by raising the sheet temperature to about 200° C. for the purpose of improving the magnetic flux density if there is no problem in the cost on the restriction of installation or production.

It is preferable that the sheet thickness of the cold rolled sheet (final sheet thickness) is a range of 0.1-1.0 mm. When it is less than 0.1 mm, the productivity is decreased, while when it exceeds 1.0 mm, the effect of decreasing the iron loss is small.

As the finish annealing applied to the cold rolled sheet with the final sheet thickness, it is preferable to adopt a continuous annealing of soaking the sheet at a temperature of 700-1100° C. for 1-300 seconds. When the soaking temperature is lower than 700° C., recrystallization is not sufficiently promoted, and good magnetic properties cannot be obtained, and further an effect of correcting the shape in the continuous annealing cannot be sufficiently obtained. On the other hand, when it exceeds 1100° C., the crystal grains are coarsened to decrease the strength or lower the toughness. It is more preferable that the soaking temperature is 800-1100° C. and the soaking time is 1-100 seconds. Moreover, the temperature and the time of the finish annealing is desirable to be low and short, respectively, as long as the iron loss is accepted for ensuring the strength of the steel sheet after the finish annealing.

The atmosphere during the soaking in the continuous annealing is preferable to be a non-oxidizing atmosphere having an oxygen potential $P_{H2O}/P_{H2}$ of not more than 0.001, because if it is an oxidizing atmosphere, oxides violently grown in the surface layer of the steel sheet block the grain growth and the iron loss properties is deteriorated. More preferably, it is not more than 0.0005.

And also, the atmosphere in the cooling after the soaking is necessary to be an oxidizing atmosphere having an oxygen potential $P_{H2O}/P_{H2}$ of not less than 0.001 for promoting segregation of P into the surface layer of the steel sheet. Preferably, it is not less than 0.003. When $P_{H2O}/P_{H2}$ is too high, unevenness of oxidation called "gas mark" is caused in the surface layer of the steel sheet to damage the appearance as a product, so that the upper limit is preferably about 5.

Moreover, the control of the atmosphere in the cooling is necessary to be performed between 700° C. and 500° C. The reason of setting to not lower than 500° C. is due to the fact that decarburization is necessary to be caused in the surface layer for promoting P segregation, while the reason of setting to not higher than 700° C. is due to the fact that when the atmosphere at a temperature exceeding 700° C. is an oxidizing atmosphere, oxides violently grown in the surface layer of the steel sheet block the grain growth and the iron loss properties is deteriorated. Preferably, it is a range of 650° C.-550° C.

And also, the time for the cooling is necessary to be a range of 1-300 seconds. When it is less than 1 second, decarburization is not promoted, while when it exceeds 300 seconds, the productivity lowers. Moreover, it is preferable to conduct the cooling for not less than 5 seconds for sufficiently promoting the decarburization in the surface layer of the steel sheet to ensure the crystal grain growth properties. Preferably, it is a range of 5-100 seconds.

In the steel sheet cooled under the above conditions after the finish annealing, a ratio ($P_{120}/Fe_{700}$) of a peak to peak height $P_{120}$ of P near to an electronic energy of 120 eV to a peak to peak height $Fe_{700}$ of Fe near to an electronic energy of 700 eV in an Auger differential spectrum obtained by analyzing the steel sheet surface with an Auger electron spectroscopy is not less than 0.02. Moreover, the ratio ($P_{120}/Fe_{700}$) is preferable to be not less than 0.03 for further enhancing the crystal grain growth in the stress relief annealing.

The steel sheet after the finish annealing produced as above has a high strength because P is added and the crystal grains are fine. Therefore, the steel sheet after the finish annealing can be used as a rotor core material as it is. Here, the steel sheet is preferable to have a yield stress (upper yield point) of not less than 400 MPa, more preferably not less than 420 MPa in order to resist against centrifugal force due to high speed rotation of the motor. The yield stress is a value measured by subjecting a test specimen defined by JIS Z2201 (preferably JIS No. 5 test specimen) to a tensile test defined by JIS Z2241.

Further, the steel sheet after the finish annealing is high in the strength and has a property that the crystal grain growth properties in the stress relief annealing are excellent because the added P is segregated into the surface layer of the steel sheet in the finish annealing. Thus, the steel sheet after the finish annealing has a low iron loss when the stress relief annealing is performed, and can be used as a stator core material.

The method of producing a motor core (rotor core and stator core) from the steel sheet after the finish annealing will be described below.

The non-oriented electrical steel sheet after the finish annealing is punched out to provide iron core materials for the rotor core and stator core simultaneously. A rotor core having a high strength can be obtained by laminating and assembling the punched-out rotor core materials, while a stator core having a low iron loss can be obtained by laminating and assembling the punched-out stator core materials and then subjecting to a stress relief annealing.

The stress relief annealing may be conducted under conditions of a usual manner and is not particularly limited. For example, it is preferable to be conducted at a temperature of 700-900° C. for 0.1-10 hours in an inert gas atmosphere. The rotor core may be subjected to a stress relief annealing, but it is preferably not subjected thereto in order to maintain the high strength.

Then, in order to decrease the iron loss in the steel sheet after the finish annealing, it is preferable to apply an insulation coating to the surface of the steel sheet. In this regard, it is preferable to apply an organic coating containing a resin for ensuring a good punchability, while a semi-organic or an inorganic coating is preferable to be applied when the weldability is considered important.

EXAMPLE

A molten steel having a chemical composition shown in Table 1 is prepared through blowing in a convertor and degassing treatment and shaped into a slab by a continuous casting method. Then, the slab is reheated at 1140° C. for 1 hour and hot rolled to form a hot rolled sheet having a sheet thickness of 2.0 mm, which is subjected to a hot band annealing at 1000° C. for 30 seconds, pickled and cold rolled to obtain a cold rolled sheet having a sheet thickness of 0.25 mm. Next, the cold rolled sheet is subjected to a finish annealing by holding at a temperature of 700-900° C. for 10 seconds in a non-oxidizing atmosphere with an oxygen potential $P_{H2O}/P_{H2}$ of 0.0005 as an atmosphere of a soaking zone and then cooling from 700° C. to 500° C. for 5-250 seconds in a non-oxidizing atmosphere having an oxygen potential $P_{H2O}/P_{H2}$ of 0.0003 or in an oxidizing atmosphere having an oxygen potential $P_{H2O}/P_{H2}$ of 0.003-3.0 to thereby obtain a cold rolled annealed sheet. Moreover, the details of the above production conditions are shown in Table 2. No. 22 in Table 2 is an example of conducting a self-annealing at 650° C. for 1 hour instead of the hot band annealing, and No. 23 is an example of conducting no annealing after the hot rolling.

With respect to the cold rolled annealed sheet, magnetic properties (iron loss $W_{10/400}$ and magnetic flux density $B_{50}$) are measured by a 25 cm Epstein test method, while a yield stress is measured by a tensile test using a JIS No. 5 specimen.

Furthermore, the cold rolled annealed sheet is subjected to a stress relief annealing in a $N_2$ atmosphere at 750° C. for 2 hours, and then $W_{10/400}$ and magnetic flux density $B_{50}$ are measured by a 25 cm Epstein test method.

TABLE 1

| Steel No. | \multicolumn{9}{c}{Chemical composition (mass %)} | | | | | | | | | |
|---|---|---|---|---|---|---|---|---|---|---|
| | C | Si | Mn | P | S | N | Al | Sn | Sb | Remarks |
| 1 | 0.0025 | 3.02 | 0.046 | 0.095 | 0.0018 | 0.0023 | 0.0008 | tr. | tr. | Inventive steel |
| 2 | 0.0029 | 3.00 | 0.046 | 0.022 | 0.0016 | 0.0022 | 0.0008 | tr. | tr. | Comparative steel |
| 3 | 0.0030 | 2.98 | 0.052 | 0.031 | 0.0021 | 0.0021 | 0.0006 | tr. | tr. | Inventive steel |
| 4 | 0.0030 | 2.98 | 0.051 | 0.142 | 0.0021 | 0.0019 | 0.0008 | tr. | tr. | Inventive steel |
| 5 | 0.0033 | 3.00 | 0.048 | 0.172 | 0.0020 | 0.0018 | 0.0007 | tr. | tr. | Comparative steel |
| 6 | 0.0027 | 1.56 | 0.046 | 0.094 | 0.0022 | 0.0020 | 0.0009 | tr. | tr. | Inventive steel |
| 7 | 0.0027 | 2.05 | 0.056 | 0.095 | 0.0022 | 0.0023 | 0.0010 | tr. | tr. | Inventive steel |
| 8 | 0.0026 | 4.03 | 0.052 | 0.090 | 0.0020 | 0.0016 | 0.0010 | tr. | tr. | Inventive steel |
| 9 | 0.0028 | 3.03 | 0.562 | 0.093 | 0.0019 | 0.0016 | 0.0009 | tr. | tr. | Inventive steel |
| 10 | 0.0033 | 3.00 | 1.975 | 0.094 | 0.0022 | 0.0018 | 0.0009 | tr. | tr. | Inventive steel |
| 11 | 0.0030 | 2.97 | 0.058 | 0.091 | 0.0055 | 0.0019 | 0.0008 | tr. | tr. | Comparative steel |
| 12 | 0.0029 | 2.99 | 0.055 | 0.096 | 0.0025 | 0.0059 | 0.0010 | tr. | tr. | Comparative steel |
| 13 | 0.0031 | 2.99 | 0.050 | 0.100 | 0.0017 | 0.0020 | 0.0042 | tr. | tr. | Inventive steel |
| 14 | 0.0030 | 3.05 | 0.046 | 0.099 | 0.0023 | 0.0024 | 0.0054 | tr. | tr. | Comparative steel |
| 15 | 0.0030 | 2.97 | 0.058 | 0.098 | 0.0016 | 0.0024 | 0.0007 | 0.009 | tr. | Inventive steel |
| 16 | 0.0027 | 3.05 | 0.051 | 0.096 | 0.0017 | 0.0022 | 0.0008 | 0.183 | tr. | Inventive steel |
| 17 | 0.0030 | 2.99 | 0.046 | 0.097 | 0.0021 | 0.0018 | 0.0008 | tr. | 0.012 | Inventive steel |
| 18 | 0.0031 | 2.97 | 0.057 | 0.092 | 0.0017 | 0.0018 | 0.0009 | tr. | 0.190 | Inventive steel |
| 19 | 0.0031 | 3.02 | 0.055 | 0.093 | 0.0017 | 0.0020 | 0.0009 | 0.036 | 0.031 | Inventive steel |
| 20 | 0.0027 | 2.98 | 0.045 | 0.095 | 0.0023 | 0.0020 | 0.0010 | tr. | tr. | Inventive steel |
| 21 | 0.0032 | 2.98 | 0.046 | 0.096 | 0.0020 | 0.0022 | 0.0009 | tr. | tr. | Inventive steel |
| 22 | 0.0033 | 3.03 | 0.052 | 0.092 | 0.0021 | 0.0020 | 0.0008 | tr. | tr. | Inventive steel |
| 23 | 0.0027 | 2.97 | 0.048 | 0.091 | 0.0020 | 0.0021 | 0.0009 | tr. | tr. | Inventive steel |
| 24 | 0.0029 | 3.00 | 0.051 | 0.092 | 0.0022 | 0.0017 | 0.0007 | tr. | tr. | Inventive steel |
| 25 | 0.0026 | 3.02 | 0.053 | 0.031 | 0.0019 | 0.0017 | 0.0009 | tr. | tr. | Inventive steel |
| 26 | 0.0033 | 3.02 | 0.051 | 0.059 | 0.0020 | 0.0018 | 0.0008 | tr. | tr. | Inventive steel |
| 27 | 0.0027 | 2.99 | 0.055 | 0.032 | 0.0021 | 0.0023 | 0.0008 | tr. | tr. | Inventive steel |
| 28 | 0.0028 | 3.03 | 0.056 | 0.056 | 0.0018 | 0.0023 | 0.0006 | tr. | tr. | Inventive steel |
| 29 | 0.0026 | 2.97 | 0.045 | 0.031 | 0.0019 | 0.0023 | 0.0006 | tr. | tr. | Inventive steel |
| 30 | 0.0025 | 2.96 | 0.049 | 0.058 | 0.0019 | 0.0017 | 0.0007 | tr. | tr. | Inventive steel |
| 31 | 0.0032 | 2.98 | 0.056 | 0.096 | 0.0016 | 0.0018 | 0.0006 | tr. | tr. | Inventive steel |
| 32 | 0.0035 | 3.05 | 0.056 | 0.091 | 0.0017 | 0.0021 | 0.0009 | tr. | tr. | Inventive steel |
| 33 | 0.0026 | 2.98 | 0.046 | 0.097 | 0.0020 | 0.0018 | 0.0007 | tr. | tr. | Inventive steel |
| 34 | 0.0030 | 2.97 | 0.054 | 0.096 | 0.0021 | 0.0022 | 0.0008 | tr. | tr. | Inventive steel |

TABLE 2

| Steel No. | Annealing after hot rolling* | Finish annealing condition | | | $P_{120}/Fe_{700}$ in surface layer of steel sheet after finish annealing | Magnetic properties before stress relief annealing | | | Magnetic properties after stress relief annealing | | Remarks |
|---|---|---|---|---|---|---|---|---|---|---|---|
| | | Temperature in soaking zone (° C.) | Cooling time from 700° C. to 500° C. (s) | $P_{H2O}/P_{H2}$ during cooling from 700° C. to 500° C. | | Iron loss $W_{10/400}$ (W/kg) | Magnetic flux density $B_{50}(T)$ | Yield stress (MPa) | Iron loss $W_{10/400}$ (W/kg) | Magnetic flux density $B_{50}(T)$ | |
| 1 | A | 800 | 10 | 0.01 | 0.13 | 19.8 | 1.692 | 433 | 12.0 | 1.691 | Inventive Example |
| 2 | A | 800 | 10 | 0.01 | 0.01 | 20.0 | 1.692 | 434 | 19.0 | 1.692 | Comparative Example |
| 3 | A | 800 | 10 | 0.01 | 0.03 | 19.9 | 1.691 | 431 | 17.6 | 1.690 | Inventive Example |
| 4 | A | 800 | 10 | 0.01 | 0.22 | 19.8 | 1.691 | 429 | 11.8 | 1.691 | Inventive Example |
| 5 | A | 800 | 10 | 0.01 | Cannot be measured with no rolling due to embrittlement | | | | | | Comparative Example |
| 6 | A | 800 | 10 | 0.01 | 0.13 | 29.6 | 1.733 | 371 | 21.0 | 1.732 | Inventive Example |
| 7 | A | 800 | 10 | 0.01 | 0.13 | 25.2 | 1.720 | 390 | 16.9 | 1.719 | Inventive Example |
| 8 | A | 800 | 10 | 0.01 | 0.14 | 17.6 | 1.663 | 478 | 9.8 | 1.662 | Inventive Example |
| 9 | A | 800 | 10 | 0.01 | 0.12 | 19.2 | 1.683 | 448 | 11.3 | 1.682 | Inventive Example |
| 10 | A | 800 | 10 | 0.01 | 0.13 | 17.2 | 1.640 | 460 | 10.0 | 1.641 | Inventive Example |
| 11 | A | 800 | 10 | 0.01 | 0.12 | 23.8 | 1.653 | 475 | 19.1 | 1.653 | Comparative Example |
| 12 | A | 800 | 10 | 0.01 | 0.12 | 23.6 | 1.647 | 462 | 19.9 | 1.648 | Comparative Example |
| 13 | A | 800 | 10 | 0.01 | 0.13 | 21.2 | 1.691 | 431 | 15.6 | 1.690 | Inventive Example |
| 14 | A | 800 | 10 | 0.01 | 0.14 | 23.1 | 1.693 | 430 | 19.6 | 1.690 | Comparative Example |
| 15 | A | 800 | 10 | 0.01 | 0.13 | 19.9 | 1.701 | 428 | 12.0 | 1.700 | Inventive Example |
| 16 | A | 800 | 10 | 0.01 | 0.12 | 20.0 | 1.711 | 431 | 11.9 | 1.710 | Inventive Example |
| 17 | A | 800 | 10 | 0.01 | 0.12 | 19.9 | 1.700 | 430 | 11.8 | 1.700 | Inventive Example |
| 18 | A | 800 | 10 | 0.01 | 0.13 | 19.8 | 1.710 | 427 | 11.9 | 1.710 | Inventive Example |
| 19 | A | 800 | 10 | 0.01 | 0.12 | 19.3 | 1.706 | 413 | 11.5 | 1.705 | Inventive Example |
| 20 | A | 700 | 10 | 0.01 | 0.12 | 22.3 | 1.690 | 463 | 11.9 | 1.693 | Inventive Example |
| 21 | A | 900 | 10 | 0.01 | 0.13 | 17.4 | 1.691 | 377 | 11.9 | 1.691 | Inventive Example |
| 22 | B | 800 | 10 | 0.01 | 0.13 | 19.9 | 1.677 | 430 | 12.0 | 1.677 | Inventive Example |
| 23 | not conducted | 800 | 10 | 0.01 | 0.12 | 19.8 | 1.665 | 432 | 11.9 | 1.665 | Inventive Example |
| 24 | A | 800 | 10 | 0.0003 | 0.01 | 19.9 | 1.691 | 432 | 19.0 | 1.690 | Comparative Example |
| 25 | A | 800 | 10 | 0.003 | 0.02 | 19.9 | 1.692 | 427 | 18.5 | 1.690 | Inventive Example |
| 26 | A | 800 | 10 | 0.003 | 0.08 | 19.9 | 1.692 | 430 | 16.3 | 1.691 | Inventive Example |
| 27 | A | 800 | 10 | 0.30 | 0.04 | 19.9 | 1.693 | 433 | 17.2 | 1.690 | Inventive Example |
| 28 | A | 800 | 10 | 0.30 | 0.09 | 19.9 | 1.691 | 429 | 13.1 | 1.691 | Inventive Example |
| 29 | A | 800 | 10 | 3.00 | 0.06 | 19.9 | 1.692 | 431 | 14.2 | 1.693 | Inventive Example |
| 30 | A | 800 | 10 | 3.00 | 0.15 | 19.9 | 1.692 | 428 | 11.8 | 1.693 | Inventive Example |
| 31 | A | 800 | 5 | 0.01 | 0.11 | 19.8 | 1.693 | 433 | 12.4 | 1.691 | Inventive Example |
| 32 | A | 800 | 60 | 0.01 | 0.15 | 19.9 | 1.691 | 433 | 11.9 | 1.692 | Inventive Example |
| 33 | A | 800 | 100 | 0.01 | 0.17 | 19.9 | 1.691 | 434 | 11.9 | 1.692 | Inventive Example |
| 34 | A | 800 | 250 | 0.01 | 0.21 | 19.9 | 1.691 | 428 | 11.8 | 1.690 | Inventive Example |

*Annealing after hot rolling: A: hot band annealing, B: self-annealing

The results of the magnetic flux density and the tensile test are shown in Table 2 together with the production conditions.

As seen from Table 1 and Table 2, a non-oriented electrical steel sheet having a high strength after the finish annealing and a low iron loss after the stress relief annealing can be stably produced by subjecting a steel sheet having a chemical composition adapted to aspects of the invention to the finish annealing under the conditions adapted to aspects of the invention, so that rotor core materials and stator core materials can be obtained simultaneously from the same raw material steel sheet.

The invention claimed is:

1. A non-oriented electrical steel sheet having a chemical composition comprising C: not more than 0.005 mass %, Si: 1.5-6.0 mass %, Mn: 0.05-2.0 mass %, P: 0.03-0.15 mass %, S: not more than 0.005 mass %, N: not more than 0.005 mass %, Al: not more than 0.005 mass % and the remainder being Fe and inevitable impurities, wherein a ratio ($P_{120}/Fe_{700}$) of a peak to peak height $P_{120}$ of P near to an electronic energy of 120 eV to a peak to peak height $Fe_{700}$ of Fe near to an electronic energy of 700 eV in an Auger differential spectrum obtained by analyzing a surface of the steel sheet after a finish annealing by an Auger electron spectroscopy is not less than 0.02.

2. The non-oriented electrical steel sheet according to claim 1, characterized by containing one or two selected from Sn: 0.005-0.2 mass % and Sb: 0.005-0.2 mass % in addition to the chemical composition.

3. The non-oriented electrical steel sheet according to claim 1, characterized in that a yield strength is not less than 400 MPa.

4. A method of producing a non-oriented electrical steel sheet according to claim 1 by hot rolling a slab having a chemical composition as claimed in claim 1, pickling without a hot band annealing or after a hot band annealing or a self-annealing, performing one cold rolling or two or more cold rollings interposing an intermediate annealing therebetween, performing a finish annealing, and forming an insulation coating, characterized in that a cooling from 700° C. to 500° C. in the finish annealing is conducted in an oxidizing atmosphere having an oxygen potential $P_{H2O}/P_{H2}$ of not less than 0.001 for 1-300 seconds, wherein $P_{H2O}$ and $P_{H2}$ are partial pressure of $H_2O$ and $H_2$ respectively.

5. A rotor core for a rotary machine, characterized in that the rotor core is formed by punching out rotor core materials from the non-oriented electrical steel sheet as claimed in claim 1 and laminating the rotor core materials.

6. A stator core for a rotary machine, characterized in that the stator core is formed by punching out stator core materials from the non-oriented electrical steel sheet as claimed in claim 1, laminating the stator core materials, and subjecting to a stress relief annealing.

7. The non-oriented electrical steel sheet according to claim 2, characterized in that a yield strength is not less than 400 MPa.

8. A method of producing a non-oriented electrical steel sheet according to claim 2 by hot rolling a slab having a chemical composition as claimed in claim 2, pickling without a hot band annealing or after a hot band annealing or a self-annealing, performing one cold rolling or two or more cold rollings interposing an intermediate annealing therebetween, performing a finish annealing, and forming an insulation coating, characterized in that a cooling from 700° C. to 500° C. in the finish annealing is conducted in an oxidizing atmosphere having an oxygen potential $H_{2O}/P_{H2}$ of not less than 0.001 for 1-300 seconds, wherein $P_{H2O}$ and $P_{H2}$ are partial pressure of $H_2O$ and $H_2$ respectively.

9. A rotor core for a rotary machine, characterized in that the rotor core is formed by punching out rotor core materials from the non-oriented electrical steel sheet as claimed in claim 2 and laminating the rotor core materials.

10. A rotor core for a rotary machine, characterized in that the rotor core is formed by punching out rotor core materials from the non-oriented electrical steel sheet as claimed in claim 3 and laminating the rotor core materials.

11. A rotor core for a rotary machine, characterized in that the rotor core is formed by punching out rotor core materials from the non-oriented electrical steel sheet as claimed in claim 7 and laminating the rotor core materials.

12. A stator core for a rotary machine, characterized in that the stator core is formed by punching out stator core materials from the non-oriented electrical steel sheet as claimed in claim 2, laminating the stator core materials, and subjecting to a stress relief annealing.

13. A stator core for a rotary machine, characterized in that the stator core is formed by punching out stator core materials from the non-oriented electrical steel sheet as claimed in claim 3, laminating the stator core materials, and subjecting to a stress relief annealing.

14. A stator core for a rotary machine, characterized in that the stator core is formed by punching out stator core materials from the non-oriented electrical steel sheet as claimed in claim 7, laminating the stator core materials, and subjecting to a stress relief annealing.

\* \* \* \* \*

UNITED STATES PATENT AND TRADEMARK OFFICE
CERTIFICATE OF CORRECTION

PATENT NO. : 10,941,458 B2
APPLICATION NO. : 15/551849
DATED : March 9, 2021
INVENTOR(S) : Hiroaki Nakajima et al.

It is certified that error appears in the above-identified patent and that said Letters Patent is hereby corrected as shown below:

In the Claims

In Column 12, Claim 4, Line 60; "$H_2O$" should read -- $H_2O$ --

In Column 13, Claim 8, Line 17; "$H_2O$" should read -- $H_2O$ --

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*